H. F. SNYDER.
TRACTOR.
APPLICATION FILED MAR. 20, 1916.

1,371,985.

Patented Mar. 15, 1921.
4 SHEETS—SHEET 1.

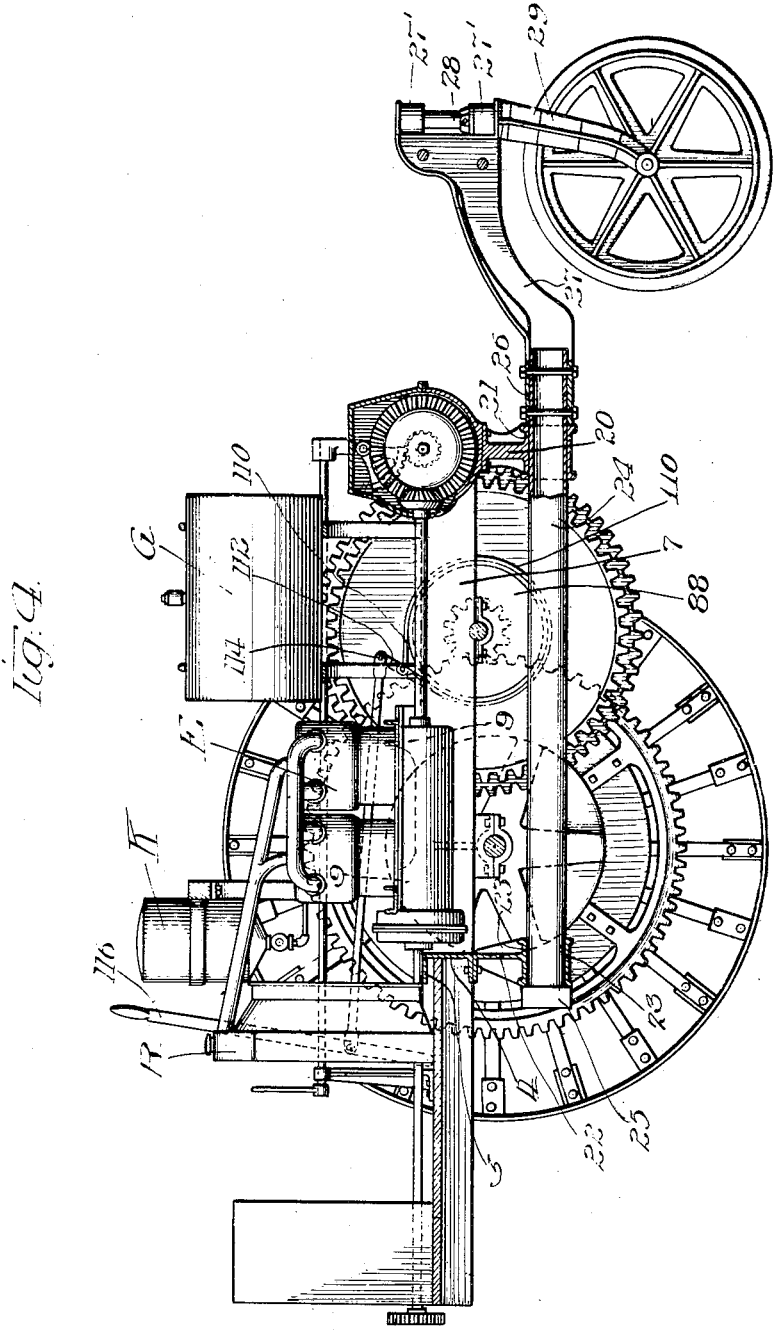

UNITED STATES PATENT OFFICE.

HOWARD F. SNYDER, OF NEWTON, IOWA, ASSIGNOR TO THE MAYTAG COMPANY, OF NEWTON, IOWA, A CORPORATION OF IOWA.

TRACTOR.

1,371,985.     Specification of Letters Patent.     Patented Mar. 15, 1921.

Application filed March 20, 1916. Serial No. 85,516.

*To all whom it may concern:*

Be it known that I, HOWARD F. SNYDER, a citizen of the United States, residing at Newton, in the county of Jasper and State of Iowa, have invented certain new and useful Improvements in Tractors, of which the following is the specification.

This invention relates to a self propelled vehicle and particularly to a tractor such as useful for agricultural work, haulage and the like.

It is an object of the invention to make an economical, simply constructed and efficient tractor which is easy to operate, flexible and easy to control.

Another object of the invention is to provide a tractor having a fore-truck so constructed and mounted upon the machine that either of the wheels of the fore truck may drop into a hollow or ride-up over an obstacle without tilting the main frame of the machine.

It is a still further object of the invention to provide a novel drive, including a differential to afford an even drive on turning corners and in addition to provide special braking means which may be used in connection with the differential to steer the tractor so as to turn it if desired.

The invention includes many other improvements and advantages not hereinabove mentioned but which will appear as the description to follow proceeds.

In the drawings:

Fig. 4 is a central view on a line 4—4 of Fig. 1.

Figure 2:
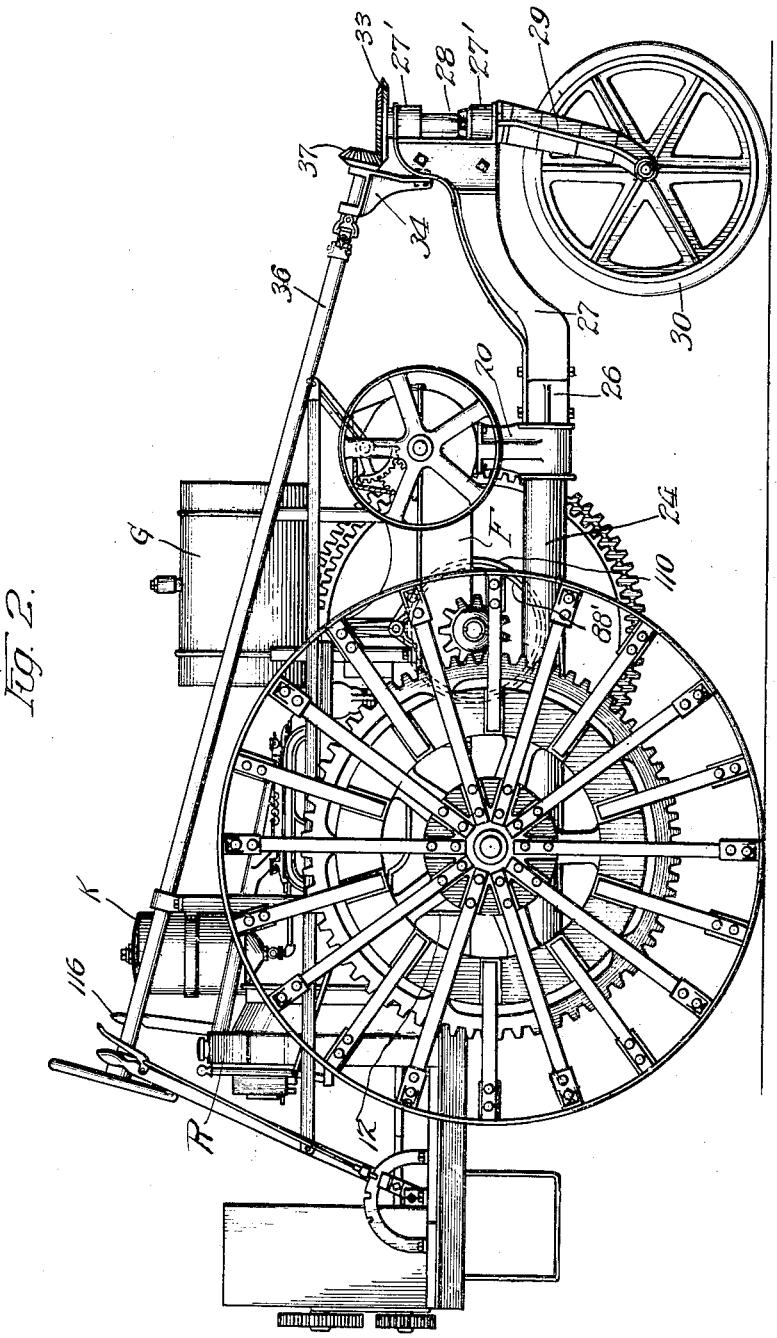
Fig. 2 is a side elevation thereof.
Figure 3:
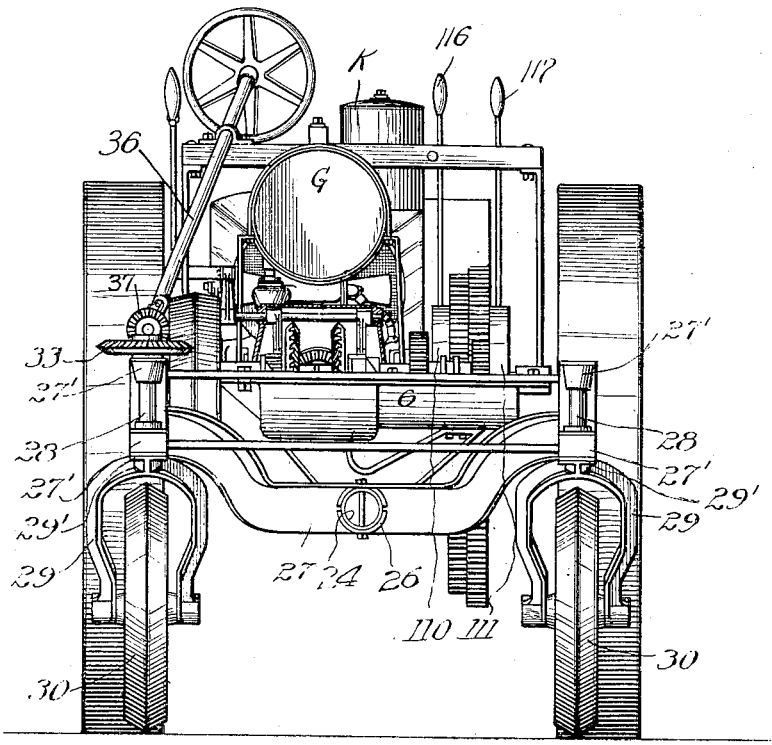
Fig. 3 is a front elevation thereof.

In the drawings, F represents generally the main or supporting frame of the machine which is made in a single casting. The frame F comprises longitudinal side members 1 and 2 of heavy steel web, braced by top flanges 3 and connected at the rear by the integral web 4, braced by the integral top flange 5, forming a continuation of the top flanges 3; the side members 1 and 2 are spanned at the front by the integral semicircular half casing 6, adapted to contain machinery hereinafter to be described. The half casing 6 and the rear member 4 are connected by the longitudinal middle span 7. The middle span 7 and side member 2 are provided with alined raised portions 8 and 9 having top flanges 10 and 11 forming an engine seat. It will be noted that the top flanges 10 and 11 are extended downwardly as indicated at 12 (see Fig. 2) providing an additional reinforcement. The frame F is provided upon its underside with integrally formed half-bearings 14 and 15 to receive the shafts hereinafter to be described and upon its front with the half casing 6 having half bearings 16 for the shafts of the machinery hereinafter to be described.

Figure 1:
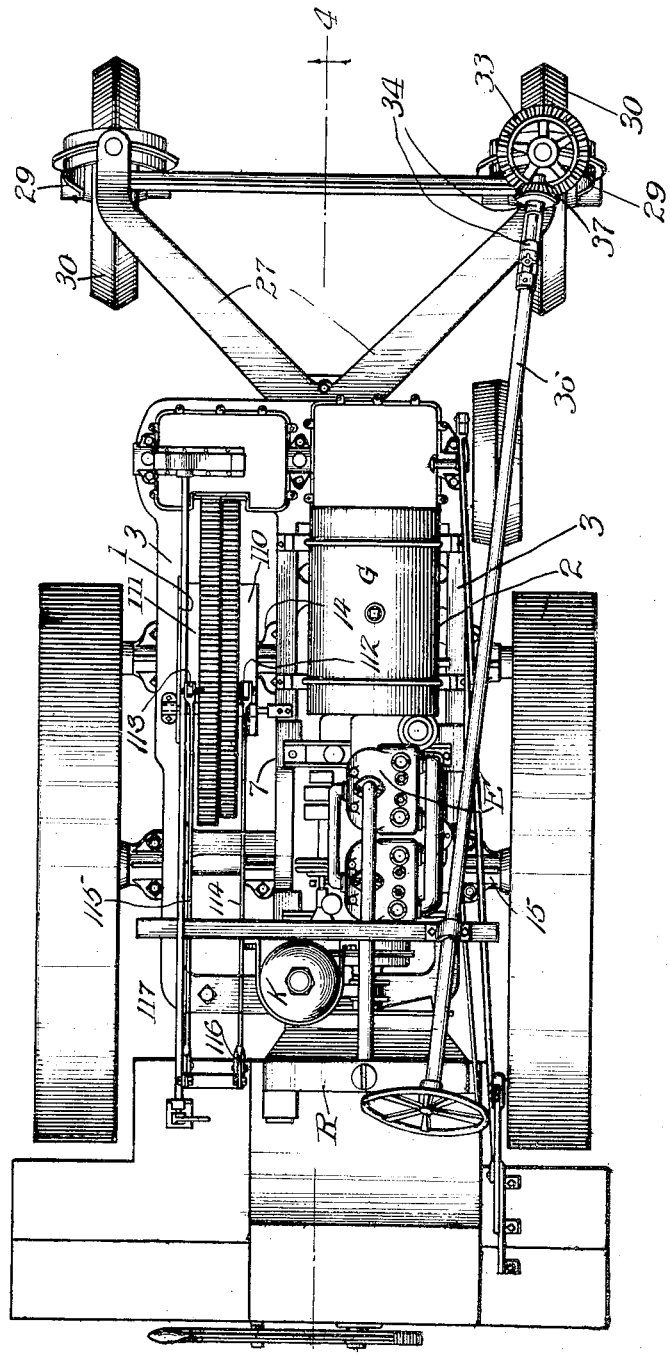
Figure 1 is a plan view of a tractor constructed in accordance with my invention.

Bolted to the casing 6 is an angled bracket 20 having therein a bearing 21; bolted to the frame at its rear is an angled bracket 22 having therein a bearing 23. Revolubly mounted in the bearings 21 and 23 is a tubular shaft 24 (see Fig. 4) having at its rear end a cap 25 rigidly mounted thereon and at its front end being sleeved within the tubular shank 26 abutting the bearing 21 so that between the cap 25 and shank 26 the tubular shaft 24 is prevented from longitudinal movement. The forks 27 each have a considerable rise as is clearly shown in Fig. 4 and are each provided with a pair of spaced bearings 27' in which are swiveled the shafts 28 rigidly connected to the forks 29 which carry wheels 30, the forks 29 being backwardly inclined as shown in Fig. 4 so that the fore-truck is supported on caster or trailing wheels; the construction being such that the weight at the forward end of the tractor is supported upon the forks 29 which are provided with bearing surfaces 29' which take against and support the lower end of the bearings 27'. One of the shafts 28 is provided at its upper end with a bevel crown gear 33. The steering rod 36 which extends backwardly to the operator's seat at the rear of the machine hereinafter described has a bearing at its forward end in a bracket 34 and is provided with a bevel pinion 37 in mesh with the gear 33 as shown in Fig. 1. By this means the tractor may be steered. It is to be particularly noted that only one of the caster wheels is positively turned to steer the tractor, the other wheel trailing in the right path. If both the fore wheels were positively operated there would be a drag or slip at times, particularly on short turns or where the tractor is turning on a point near its own rear axle, in which event the paths followed by the fore wheels are not parallel.

The revoluble mounting of the fore-truck in the bearings 21 and 23 is an important feature of the invention. By this construction the entire fore truck may be rocked upon a longitudinal axis low down in the machine so as to permit either of the fore wheels to drop into a depression or ride up over an obstacle without twisting or racking the machine, while at the same time either of the supporting or propelling wheels of the machine hereinafter to be described, may also rise or drop without racking the machine, raising any of the wheels or diminishing the perfectly solid support of all the machinery upon it.

The action of a differential drive is so well known that it need not be explained here. Suffice it to say that by the differential drive above described, the tractor may be made to turn corners or the like without either driving wheel being forced to slip or strain the machinery. This is accomplished as follows:

The brake wheels 88' and 92 are surrounded by brake bands 110 and 111 controlled by tightening arms 112 and 113 in turn operated by links 114 and 115 (see Figs. 1 and 4). The links 114 and 115 are connected at their rear ends to handles 116 and 117 whereby the operator may brake either of the differentials. This operation is extremely useful in a machine of this character (and I consider it broadly new); by means of it the turning radius may be very materially reduced because the operator may bring one wheel to rest while the other is driving and thus pivot the machine and swing it about upon its own center. It should be noticed that the caster wheels being provided in the fore-truck the tractor of my invention may be steered either by means of the brakes just described, by which the machine can be turned upon a short radius or steered in any direction, the caster wheels merely trailing, or by means of the steering wheel control of the caster wheels shown, or by both methods at once. The selective and double control of the steering is of the greatest advantage, particularly in haulage and agricultural work where turns must be made in fence corners or other cramped spaces.

Accessory apparatus forming in itself no part of the invention and well known in the art, such as tanks G and K, the radiator R and so on is provided.

Having now described my invention, I claim:

1. In apparatus of the class described, a frame, propelling wheels mounted on the frame, a longitudinally extending support journaled in the frame for movement about a horizontal axis, a fore truck connected to said support, a pair of caster wheels swivelly mounted on said fore truck and steering means for turning one only of said caster wheels, whereby the other will automatically adjust itself to the direction in which the apparatus is being propelled.

2. In apparatus of the class described, a frame, a fore truck journaled on the frame for motion about a horizontal axis, caster wheels swivelly mounted on said fore truck and steering means for turning one only of said caster wheels whereby the other caster wheel may trail in its proper path when the tractor is turned on a short radius.

3. In apparatus of the class described, a frame, substantially spaced bearings suspended from and rigidly connected to said frame, a shaft journaled in said bearings below said frame, means for preventing said shaft from shifting longitudinally in said bearings, a fore truck rigidly mounted in front of said bearings upon the forward end of said shaft, and a pair of spaced caster wheels swivelly mounted on said fore truck to automatically adjust themselves to the direction in which the apparatus is being propelled.

4. In apparatus of the class described, a frame, propelling and supporting wheels adjacent the rear of the frame, a longitudinal shaft suspended from and revolubly mounted with respect to the frame, a fore truck on said shaft said fore truck comprising a fork having upwardly bent arms, a caster wheel swivelly mounted in each of said arms to automatically adjust itself to the direction in which the apparatus is being propelled, substantially as described.

5. In apparatus of the class described, a pair of supporting and traction wheels, a shaft carried by said wheels, a frame mounted on said shaft, a longitudinal shaft suspended from and revolubly mounted with respect to the frame, a fore truck on said longitudinal shaft comprising a fork, a wheel mounted in each of the two branches of said fork in such a way that they will automatically adjust themselves to the direction in which the apparatus is being propelled.

6. In apparatus of the class described, a pair of supporting and traction wheels, a frame supported by said wheels, a longitudinal shaft suspended from and revolubly mounted with respect to the frame, a fore truck on said shaft comprising a fork, a caster wheel swivelly mounted in each of the two branches of said fork, and steering means for turning one only of said caster wheels whereby the other will swivel free to automatically adjust itself to the direction in which the apparatus is being propelled.

In witness whereof, I hereunto subscribe my name to this specification in the presence of two witnesses.

HOWARD F. SNYDER.

Witnesses:
W. I. SPARKS,
L. B. MAYTAG.